(12) United States Patent
Timmons et al.

(10) Patent No.: US 8,179,092 B2
(45) Date of Patent: May 15, 2012

(54) LITHIUM-ION AIRCRAFT BATTERY WITH AUTOMATICALLY ACTIVATED BATTERY MANAGEMENT SYSTEM

(75) Inventors: John B. Timmons, Winston-Salem, NC (US); David G. Vutetakis, High Point, NC (US)

(73) Assignee: Concorde Battery Corporation, West Covina, CA (US)

( * ) Notice: Subject to any disclaimer, the term of this patent is extended or adjusted under 35 U.S.C. 154(b) by 295 days.

(21) Appl. No.: 12/758,124

(22) Filed: Apr. 12, 2010

(65) Prior Publication Data

US 2011/0248680 A1    Oct. 13, 2011

(51) Int. Cl.
*H01M 10/46* (2006.01)

(52) U.S. Cl. .................................................. 320/112

(58) Field of Classification Search .......... 320/107, 320/112, 114, 115, 116; 429/96, 97, 98, 429/99, 100
See application file for complete search history.

(56) References Cited

U.S. PATENT DOCUMENTS

| | | | |
|---|---|---|---|
| 4,977,515 A * | 12/1990 | Rudden et al. ............ 700/296 |
| 6,031,302 A | 2/2000 | Levesque | |
| 6,121,751 A | 9/2000 | Merritt | |
| 6,452,363 B1 | 9/2002 | Jabaji | |
| 6,577,104 B2 | 6/2003 | Sakakibara | |
| 6,586,911 B1 | 7/2003 | Smith et al. | |
| 6,596,439 B1 | 7/2003 | Tsukamoto | |
| 6,653,820 B1 | 11/2003 | Smith | |
| 6,797,427 B2 | 9/2004 | Maleki et al. | |
| 2006/0214627 A1 | 9/2006 | Ito et al. | |
| 2008/0233469 A1 | 9/2008 | Drozdz et al. | |
| 2008/0318117 A1 | 12/2008 | Gross et al. | |
| 2009/0063877 A1 * | 3/2009 | Lewis et al. .................. 713/310 |
| 2009/0123813 A1 | 5/2009 | Chiang et al. | |
| 2009/0184682 A1 | 7/2009 | Kosugi et al. | |
| 2009/0184684 A1 | 7/2009 | Zonkoski et al. | |
| 2009/0189568 A1 | 7/2009 | Vasselin et al. | |
| 2009/0295230 A1 * | 12/2009 | Rousu et al. .................. 307/80 |

FOREIGN PATENT DOCUMENTS

| | | |
|---|---|---|
| JP | 8083627 A1 | 3/1996 |
| JP | 2002320334 A2 | 10/2002 |
| WO | WO2008055505 A1 | 5/2008 |

* cited by examiner

*Primary Examiner* — Edward Tso
(74) *Attorney, Agent, or Firm* — Womble Carlyle Sandridge & Rice, LLP

(57) ABSTRACT

A rechargeable aircraft battery assembly includes at least one lithium-ion cell having a positive cell terminal and a negative cell terminal and a battery management circuit operable to control charging and/or discharging of the lithium-ion cell. The battery management circuit is constantly off when the aircraft circuit is not engaged with the battery connector and is constantly on when the aircraft circuit is engaged with the battery connector.

17 Claims, 7 Drawing Sheets

LITHIUM-ION AIRCRAFT BATTERY WITH AUTOMATICALLY ACTIVATED BATTERY MANAGEMENT SYSTEM

TECHNICAL FIELD

This invention relates to batteries, and more particularly relates to a rechargeable lithium-ion battery for aircraft applications having an integrated battery management system that is automatically activated when the battery is installed in an aircraft and remains activated as long as the battery remains installed in the aircraft.

BACKGROUND

An aircraft often includes one or more batteries for providing electrical power to the aircraft's electrical systems when power is not available from an onboard electrical generator or from ground equipment. Most current aircraft batteries are made of lead-acid cells or nickel-cadmium cells. Recently, lighter-weight lithium-ion batteries are being increasingly considered as alternatives to lead-acid and nickel-cadmium batteries in order to help minimize the overall weight of aircraft. Such lithium-ion batteries typically include a number of individual lithium-ion cells that are connected in series. While considerably lighter in weight, lithium-ion batteries, if not properly maintained and kept under control, can cause fires, which can be catastrophic. Unlike lead-acid and nickel-cadmium batteries, in order to provide the necessary safety controls lithium-ion batteries require imbedded electronics to monitor and regulate the condition of the batteries' lithium-ion cells. Such imbedded electronic circuitry is often called a battery management system ("BMS"). Though the functionalities of different battery management systems can vary, a BMS can be configured to perform several monitoring and control functions, including: measuring a battery's state of charge to determine the amount of remaining energy stored in the battery; measuring a battery's state of health to determine the battery's life expectancy; providing battery protection monitoring to ensure safe battery operation; providing charge control for regulating charging current and voltage; providing discharge control to ensure that no cells are overly discharged; and providing cell balancing to ensure that all lithium-ion cells are charged to substantially the same capacity. By preventing improper charging and discharging of lithium-ion cells, a BMS can prevent sub-optimal battery power output, shortened cell lifespan, cell damage, and potentially hazardous over-heating. By providing cell balancing, the BMS can ensure that there are no individual undercharged cells that will discharge prematurely and cause the entire battery to become inoperable, or overcharged cells that will lead to cell venting and excessive cell temperatures.

SUMMARY

A BMS requires a small amount of electrical power to operate and monitor its circuitry.

This electrical power is normally supplied by a battery's lithium-ion cells, although it also can be externally supplied when the battery is connected to an external power source. When a battery is in storage prior to installation in an aircraft, the battery's lithium-ion cells are being used to power the battery's BMS. Accordingly, the BMS becomes a parasitic load, which, while relatively low, can steadily drain the power from a stored battery and thereby limit the battery's shelf life. Such a battery will normally completely discharge over a 1-2 year period and will then be rendered unusable. The inventors, recognizing this situation, have determined a way to eliminate or substantially prevent the constant drain of energy from an aircraft battery's lithium-ion cells by its BMS, while the battery is stored, in order to extend the battery's shelf life up to 10 years or more. Toward this end, according to the invention, the BMS is automatically activated only upon connection to the aircraft's electrical system or to an external power source. Stated otherwise the electrical power connection from the BMS to the lithium-ion cells is not completed until the battery is connected to the aircraft electrical system or to an external power source. This invention is especially beneficial in military aircraft applications, where a shelf life of 3 years or more is required.

In one embodiment, a rechargeable battery system for supplying electrical power to an aircraft includes a battery assembly having at least one lithium-ion cell with a positive cell terminal and a negative cell terminal. The battery assembly further includes a battery management circuit operable to control charging and/or discharging of the lithium-ion cell(s) and having an off state and an on state. The battery management circuit is connected to the positive cell terminal by a first conductor. The battery assembly also includes a battery connector having a first jumper terminal and a second jumper terminal, a second conductor connecting the battery management circuit to the first jumper terminal, and a third conductor connecting the second jumper terminal to the negative cell terminal. An external connector is configured to be engaged with the battery connector and includes a jumper that electrically connects the first jumper terminal to the second jumper terminal when the battery connector is engaged with the external connector. The battery management circuit is constantly in the off state when the external connector is not engaged with the battery connector, and the battery management circuit is constantly in the on state when the external connector is engaged with the battery connector. It should be apparent that the jumper could just as easily connect a normally open connector from the BMS to the positive terminal of the lithium-ion cell(s).

Another embodiment includes a method of managing a rechargeable battery configured for connection to an external device and having one or more lithium-ion battery cells. The method includes providing a battery management circuit; preventing the supply of power from the battery cells to the battery management circuit when the rechargeable battery is disconnected from the external device; and supplying power from the battery cells to the battery management circuit when the rechargeable battery is connected to the external device. The battery management circuit is always off when the rechargeable battery is disconnected from the external device and the battery management circuit is always on when the rechargeable battery is connected to the external device.

A further embodiment includes a battery management system for a rechargeable battery having at least one battery cell. The battery management system includes a battery connector adapted to connect the rechargeable battery to an external device and having a first contact and a second contact. The system also includes a battery management circuit having a first lead and a second lead, the first lead being connected to a first terminal of the battery cell, and the second lead being connected to the first contact. A conductor connects the second terminal of the battery cell to the second contact, and an external connector includes a jumper configured to selectively connect the first contact and the second contact when the external connector is removably connected to the battery. Power is supplied from the battery cell(s) to the battery management circuit when the jumper connects the first contact and the second contact. No power is supplied from the battery cell(s) to the battery control circuit when the jumper does not connect the first contact and the second contact. Again, it should be apparent that the jumper connection could be placed in the conductor line from the positive terminal of the lithium-ion cell to the BMS.

Still other embodiments could utilize different configurations for automatically activating the battery management system only upon connection into the aircraft's electrical system or to an external power source.

These and other aspects and features of the invention will be understood from a reading of the following description together with the drawings.

DESCRIPTION

Figure 1:
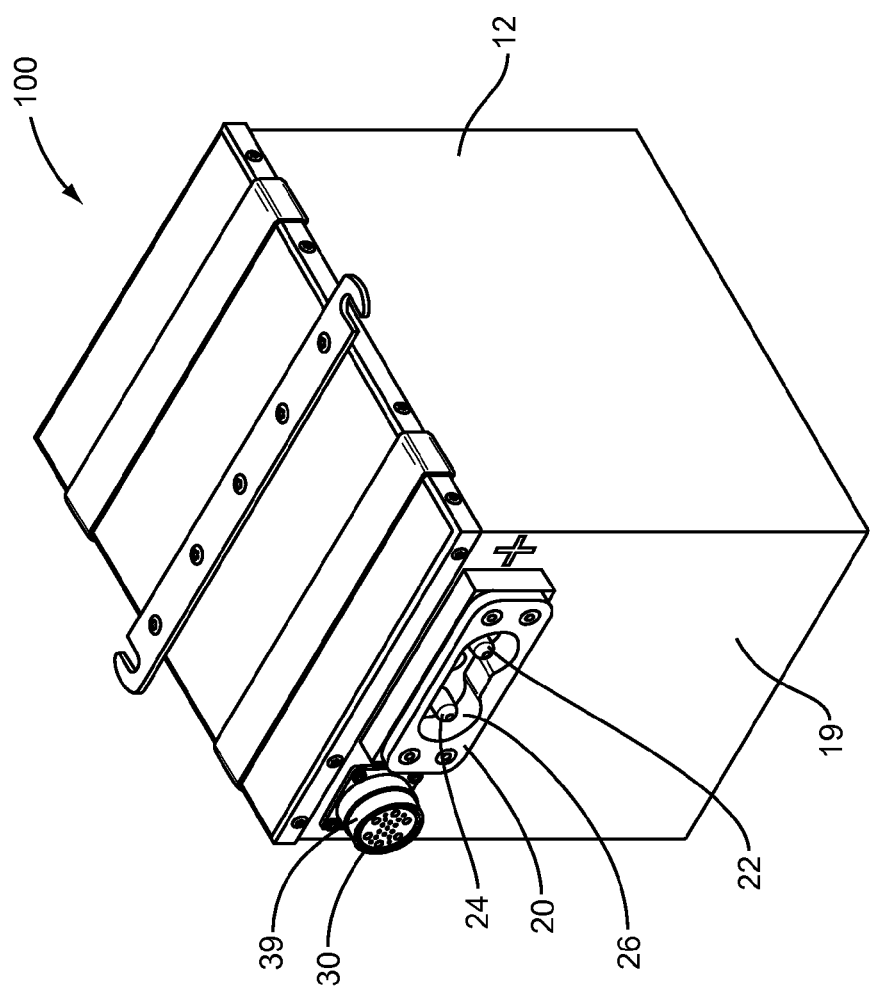
FIG. 1 is a perspective view of one embodiment of a lithium-ion battery for an aircraft according to the invention.
Figure 2:
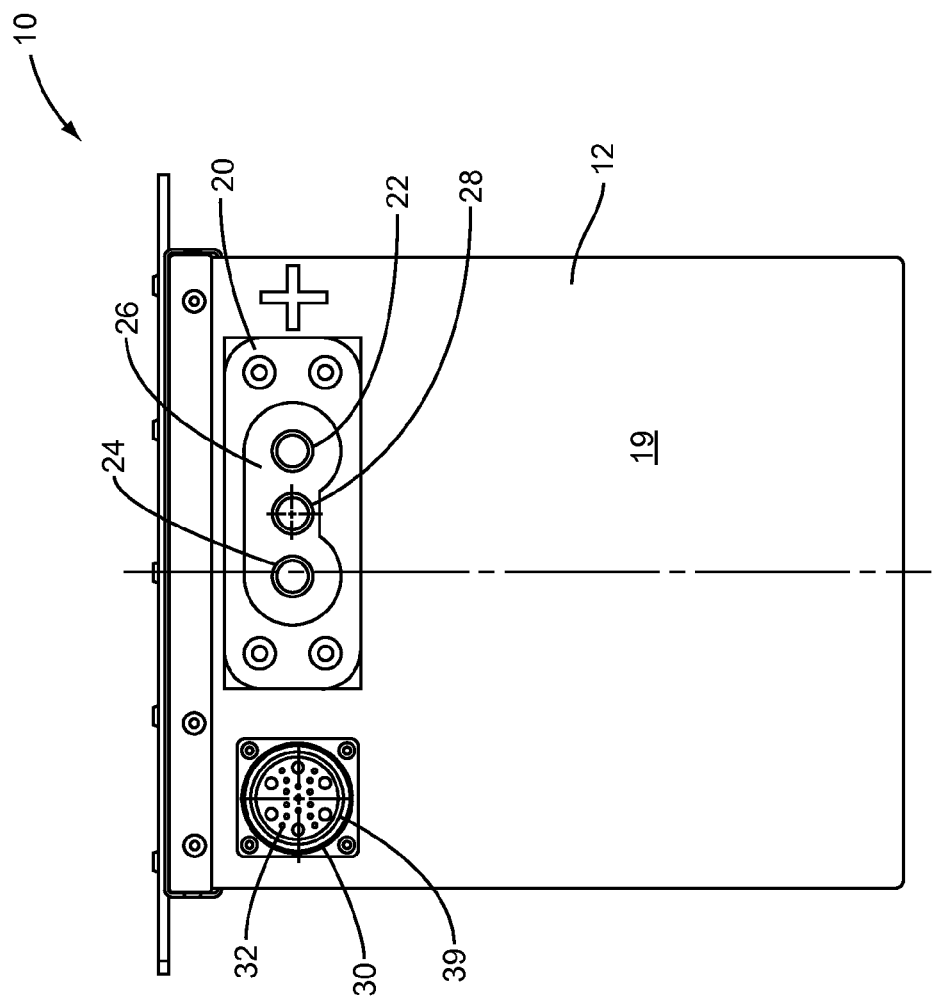
FIG. 2 is an elevation view of one side of the battery shown in FIG. 1.

FIGS. 1-6 show one embodiment of a 24-volt lithium-ion aircraft battery 10 according to the invention. In this embodiment, as illustrated in FIGS. 1 and 2, the battery includes an outer case 12 having a side 19. The side 19 includes a battery power receptacle 20 having a positive battery terminal 22 and a negative battery terminal 24 that are disposed within a recess 26. In one embodiment, the battery power receptacle 20 is a MS3509 receptacle (Rebling Plastics) that may be modified as described below. Other types of electrical power receptacles can also be used. The battery power receptacle 20 is configured to permit the battery 10 to be connected to an aircraft's electrical system. Such a connection permits the battery 10 to supply electrical power to the aircraft, and also allows a charging current to be supplied from the aircraft to the battery 10. As shown in FIGS. 1 and 2, the side 19 can also include a battery auxiliary receptacle 30. The battery auxiliary receptacle 30 is configured to permit the battery 10 to be connected to an aircraft's maintenance system, monitoring system, or the like. It can also be used to provide power to internal heating elements, independent of the power connector. In one embodiment, the battery auxiliary receptacle 30 is a type M83723/71R2025N receptacle (Amphenol) that may be modified as described below. A variety of other types of auxiliary receptacles can also be used. As shown in FIG. 1, the battery auxiliary receptacle 30 can include an outwardly extending male portion 39.

Figure 3:
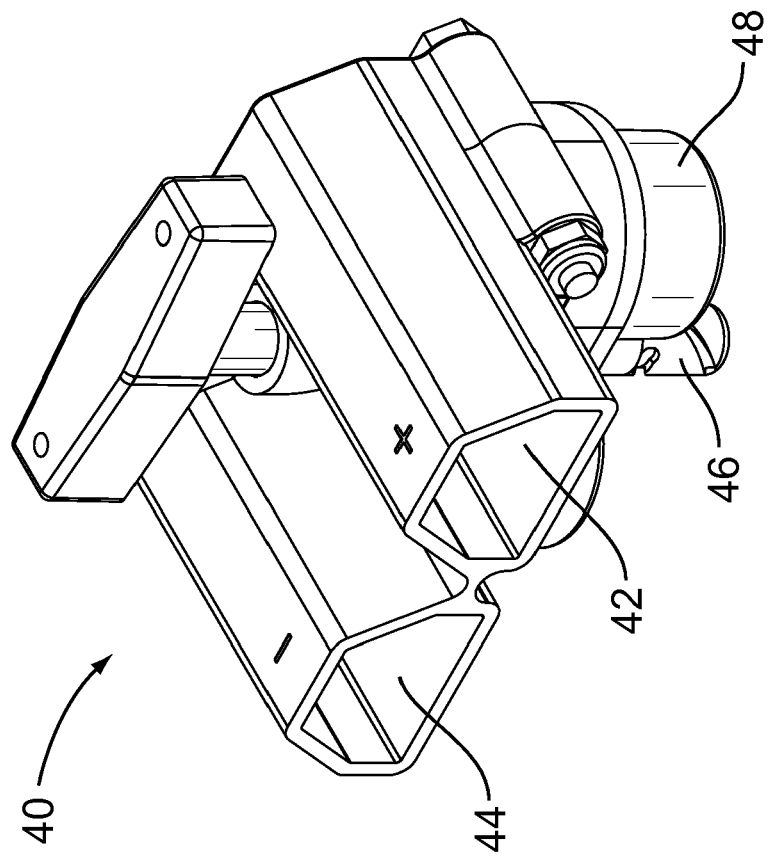
FIG. 3 is a perspective view of one embodiment of an electrical power connector for connecting the battery shown in FIGS. 1 and 2 to an aircraft's electrical system.

FIG. 3 shows a typical aircraft power connector or plug 40 (Rebling 7016 for example) configured to be engaged with the battery power receptacle 20 of the battery 10. As shown in FIG. 3, the aircraft power connector 40 can include a male portion 48 that is configured to be received within the recess 26 of the battery power receptacle 20 shown in FIGS. 1 and 2. As also shown in FIG. 3, the aircraft power connector 40 can include a positive aircraft terminal 42 configured for connecting a positive aircraft power cable (not shown) to the connector 40, and a negative aircraft terminal 44 configured for connecting a positive aircraft power cable (not shown) to the connector 40. As shown in FIG. 3, the aircraft power connector 40 can also include a retainer 46 that is received within an opening 28 in the battery power receptacle 20 (shown FIG. 2) when the male portion 48 of the aircraft power connector 40 is received within the recess 26 of the battery power connector 20. The retainer 46 and the mating opening 28 in the battery power connector 20 can include mating threads that cause the aircraft power connector 40 to be drawn into and retained within the battery power receptacle 20 when the retainer 46 is twisted within the opening 28.

Figure 4:
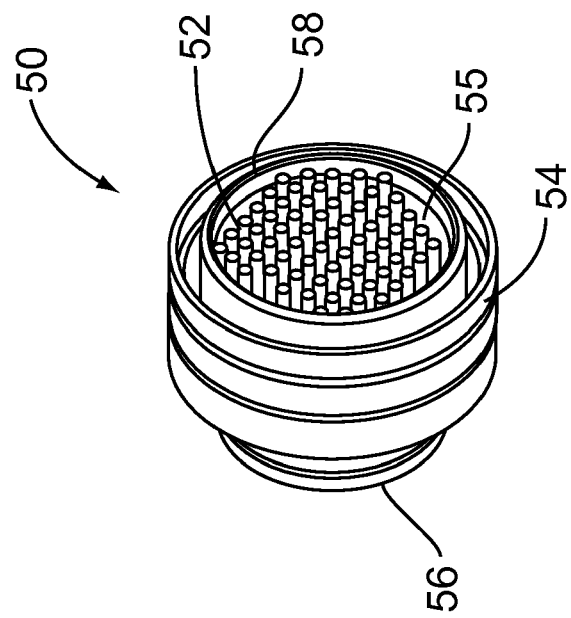
FIG. 4 is a perspective view of one embodiment of an auxiliary connector for connecting the battery shown in FIGS. 1 and 2 to an aircraft's maintenance and/or monitoring system.

FIG. 4 shows a typical aircraft mating connector or plug 50 (Amphenol M83723/75 for example) configured to be engaged with the battery auxiliary receptacle 30 on the battery 10. As shown in FIG. 4, the aircraft mating connector 50 can include battery connection end 58 and an opposed aircraft connection end 56. In the embodiment shown, the battery connection end 58 includes a cylindrical housing 54 that forms a circular recess 55. A plurality of spaced pin connectors 52 are included within the circular recess 55. The recess 55 is configured to receive the male portion 39 of the battery auxiliary receptacle 30 shown in FIG. 1. When the aircraft mating connector 50 is engaged with the battery auxiliary receptacle 30, the spaced pin connectors 52 engage mating pin receptacles 32 located within the battery auxiliary receptacle 30 (shown in FIG. 2), thereby establishing a plurality of electrical and/or communication links between the battery 10 and an aircraft.

Figure 5:
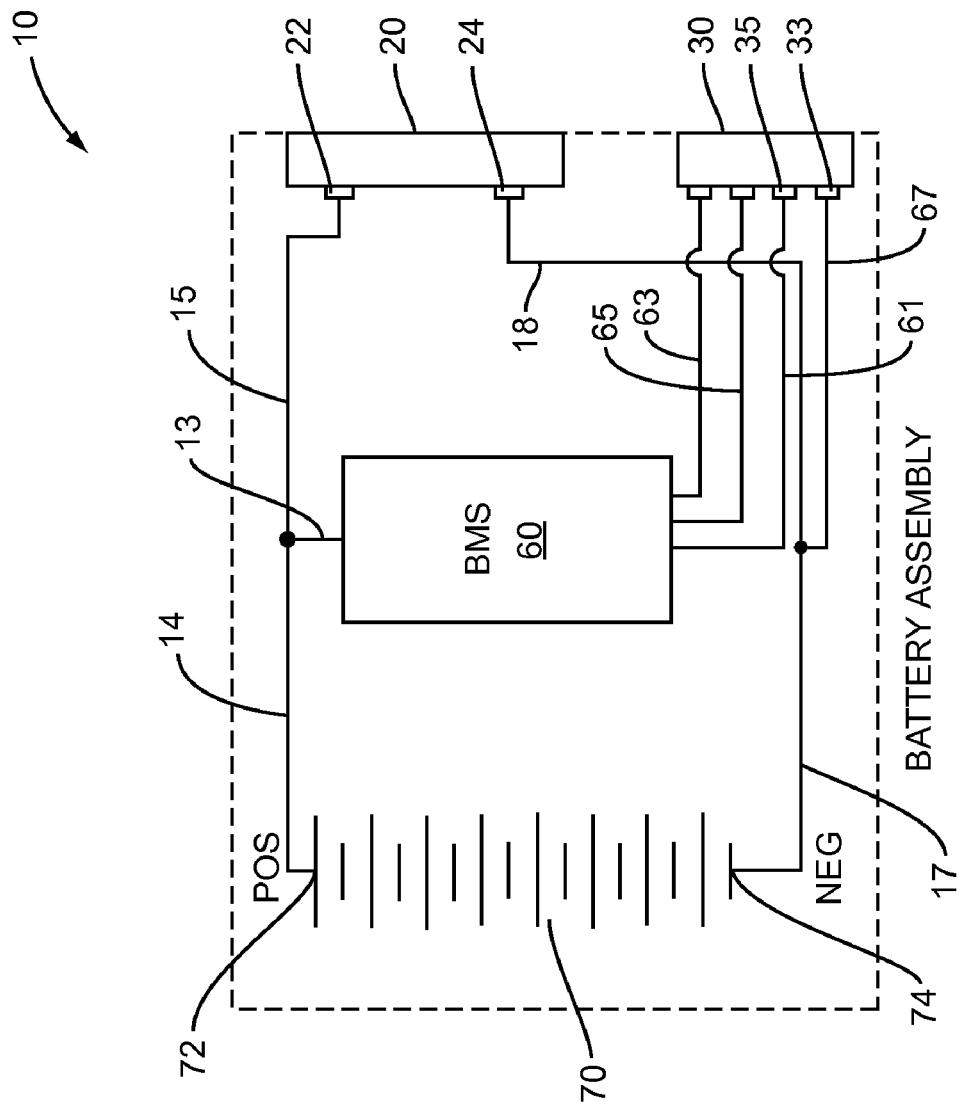
FIG. 5 is a circuit diagram of one embodiment of a lithium-ion battery for an aircraft according to the invention.
Figure 6:
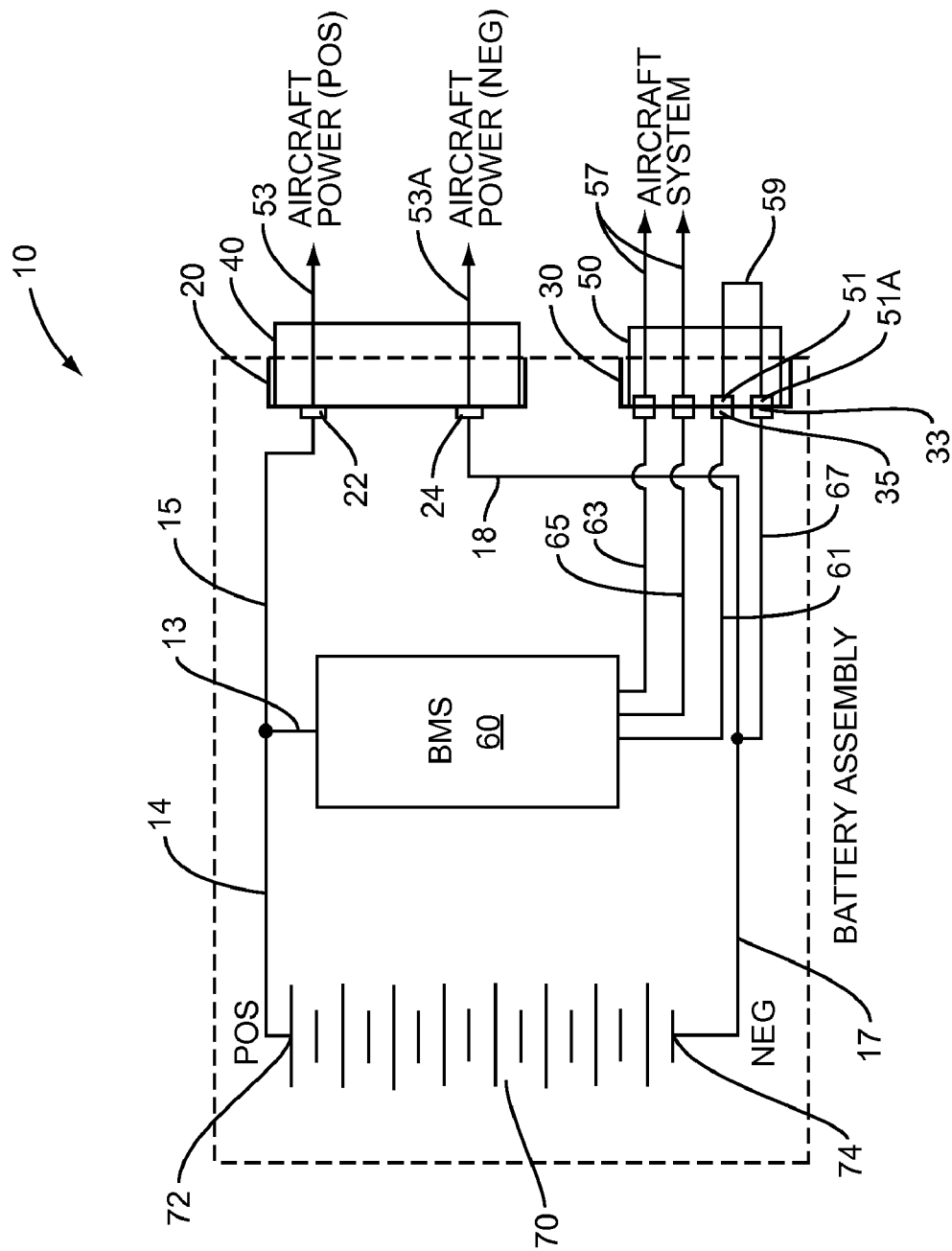
FIG. 6 is a circuit diagram showing the lithium-ion battery of FIG. 5 connected to an aircraft.

FIGS. 5 and 6 show one embodiment of circuit diagrams for battery 10 according to the invention. FIG. 5 shows the battery 10 in a stored, uninstalled state. As shown in FIG. 5, the battery 10 includes a plurality of lithium-ion cells 70 connected together in a series arrangement. The series of cells 70 includes a positive cell terminal 72 and a negative cell terminal 74. The positive cell terminal 72 is connected to the positive battery terminal 22 of the battery power connector 20 by one or more conductors 14, 15. Similarly, the negative cell terminal 74 is connected to the negative battery terminal 24 of the battery power connector 20 by one or more conductors 17 and 18. As also shown in FIG. 5, the battery 10 includes a battery management system (BMS) 60. The BMS 60 can be substantially any type of BMS configured to monitor or control one or more lithium-ion cells 70. For example, the BMS 60 can be configured to measure the state of charge of the battery 10 and cells 70 to determine the amount of remaining energy stored in the battery 10; measure the state of health of the battery 10 and cells 70 to determine the battery's life expectancy; provide protection monitoring for the battery 10 and cells 70 to ensure safe battery operation; provide charging control for the cells 70 to regulate charging current and voltage; provide discharging control to ensure that none of the cells 70 become overly discharged; and provide balancing of the cells 70 to ensure that all of the lithium-ion cells 70 are charged to substantially the same capacity.

As shown in FIG. 5, the BMS 60 is connected to the positive battery cell terminal 72 by one or more conductors 13, 14. Another conductor 61 connects the BMS 60 to a first contact 35 on the battery instrumentation connector 30. A second contact 33 on the battery instrumentation connector 30 is connected to the negative battery cell terminal 74 by one or more conductors 67, 17. Accordingly, in the stored, uninstalled state shown in FIG. 5, no power is supplied to the BMS 60 from the battery cells 70 due to the open circuit between the BMS 60 and the negative battery cell terminal 74. As also shown in FIG. 5, one or more communication links 63, 65 are provided between the BMS 60 and the battery information connector 30. It should be apparent that the open circuit also could be established between the BMS 60 and the positive battery cell terminal 72.

FIG. 6 shows the battery 10 installed in an aircraft. In its installed state, the battery's power connector 20 is engaged with an aircraft power connector 40 such that a positive aircraft power cable 53 is in electrical contact with the battery's positive terminal 22 and a negative aircraft power cable 53A is in electrical contact with the battery's negative terminal 24. Accordingly, in the installed state shown in FIG. 6, the battery 10 can provide electrical power from the battery cells 70 to an aircraft via the conductors 14, 15, 17 and 18, the engaged power connectors 20, 40, and the aircraft power cables 53, 53A. In addition, in the installed state shown in FIG. 6, the aircraft can provide electrical power to the battery cells 70 for charging the battery cells 70 via the aircraft power cables 53, 53A, the engaged connectors 20, 40, and the conductors 14, 15, 17 and 18.

As also shown in FIG. 6, when the battery 10 is installed in an aircraft, the aircraft's mating connector 50 is engaged with the battery auxiliary receptacle 30. The aircraft mating connector 50 includes a third contact 51, a fourth contact 51A, and a jumper 59 that provides an electrically conductive path between the third contact 51 and the fourth contact 51A. When the aircraft mating connector 50 is engaged with the battery auxiliary receptacle 30 as shown in FIG. 6, the first contact 35 on the battery connector 30 contacts the third contact 51 on the aircraft connector 50 and the second contact 33 on the battery connector 30 contacts the fourth contact 51A on the aircraft connector 50. As a result, the conductor 61, mated contacts 35, 51, the jumper 59, mated contacts 33, 51A, and conductors 67 and 17 combine to form an electrically conductive path between the BMS 60 and the negative battery cell terminal 74. Consequently, in the installed state shown in FIG. 6, electrical power is constantly supplied from the lithium-ion cells 70 to the BMS 60. Accordingly, when the battery 10 is installed in an aircraft and connected as shown in FIG. 6, the BMS is always powered on and is able to constantly monitor and control operation, charging and discharging of the battery cells 70, including balancing the capacities of the lithium-ion cells 70, for example. In addition, when the auxiliary receptacle 30 and mating connector 50 are engaged with each other as shown in FIG. 6, the aircraft's maintenance and/or monitoring systems are coupled to the BMS 60 via coupled communication links 63, 65 and 57, and battery information can be exchanged between the BMS 60 and the aircraft. While the contacts 33, 35 are installed in the auxiliary receptacle in the FIG. 5, 6 embodiment, they could just as easily be placed in the battery power receptacle 20, with the jumper 59 placed in the aircraft power connector 40.

Figure 7:
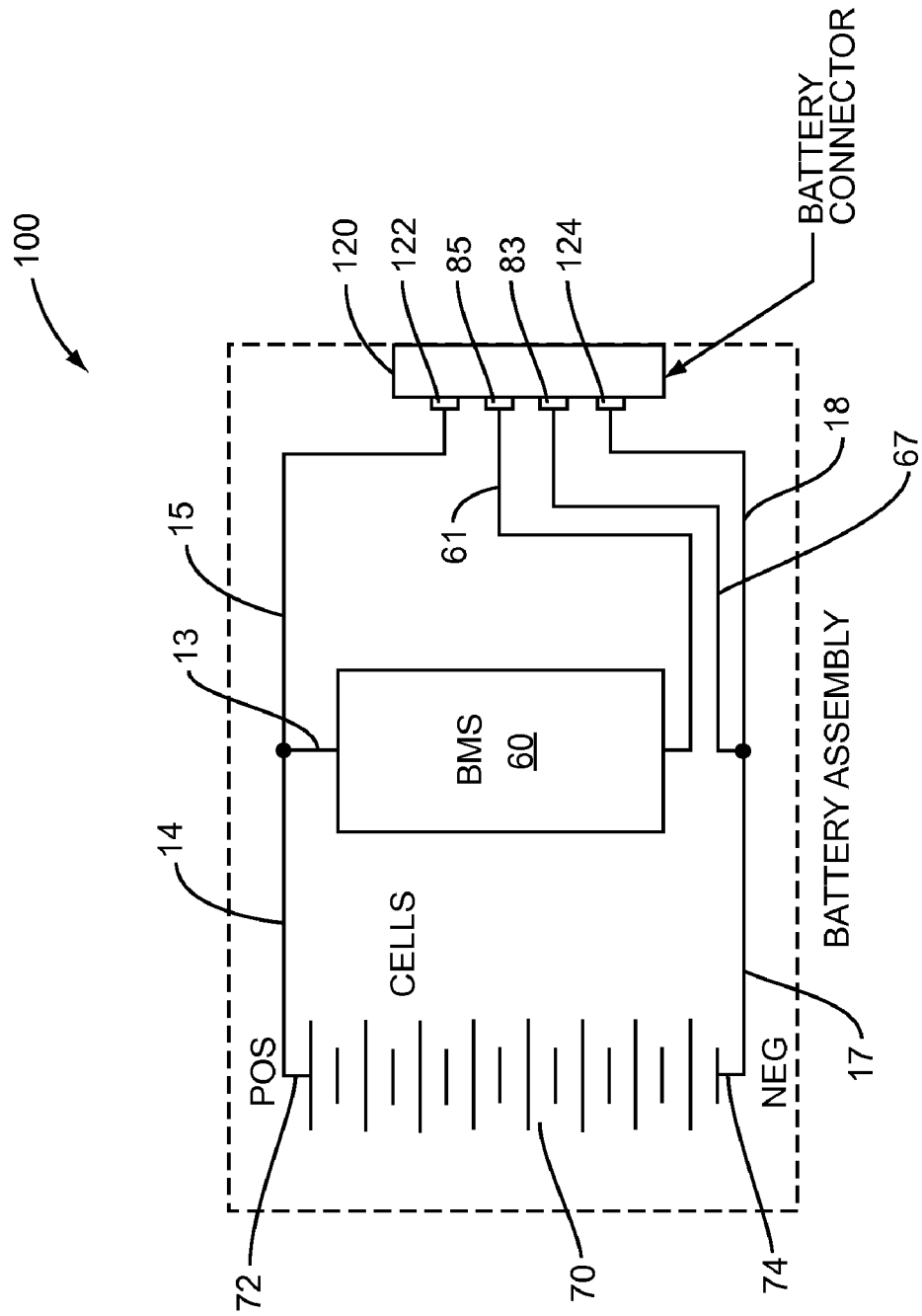
FIG. 7 is a circuit diagram of another embodiment of a lithium-ion battery for an aircraft according to the invention.
Figure 8:
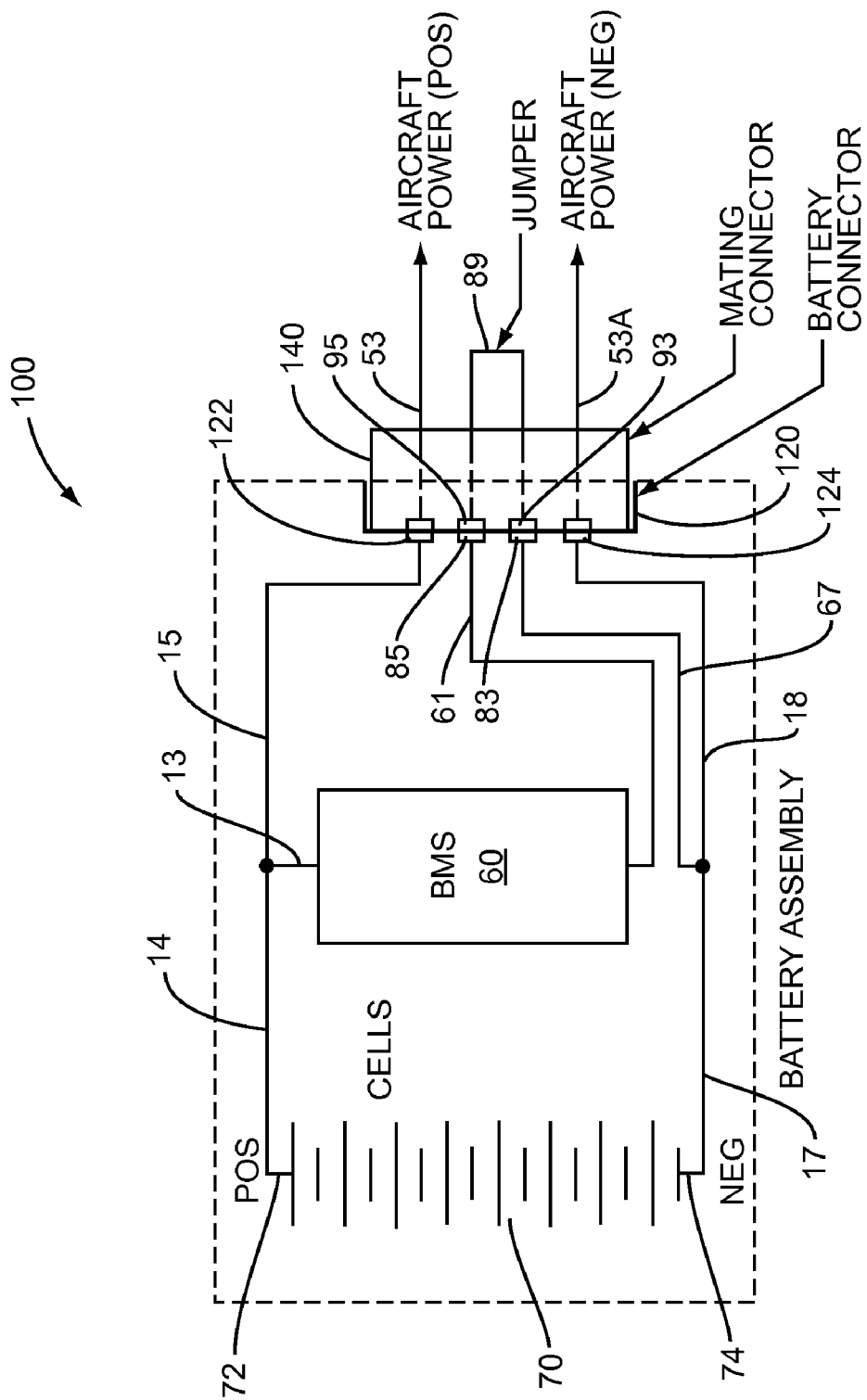
FIG. 8 is a circuit diagram showing the lithium-ion battery of FIG. 7 connected to an aircraft.

FIGS. 7 and 8 show another embodiment of circuit diagrams for a slightly different type of battery 100 according to the invention. FIG. 7 shows the battery 100 in a stored, uninstalled state. As shown in FIG. 7, the battery 100 includes a plurality of lithium-ion cells 70 connected together in a series arrangement. The series of cells 70 include a positive cell terminal 72 and a negative cell terminal 74. The positive cell terminal 72 is connected to a positive battery terminal 122 on a battery power connector 120 by one or more conductors 14, 15. In this embodiment, the negative cell terminal 74 is connected to a negative battery terminal 124 of the battery power connector 120 by one or more conductors 17 and 18. As also shown in FIG. 7, the battery 100 includes a battery management system (BMS) 60. Again, the BMS 60 can be substantially any type of BMS configured to monitor and/or control one or more lithium-ion cells 70. In particular, the BMS 60 can be configured to balance the cells 70 to ensure that all of the lithium-ion cells 70 are charged to substantially the same capacity. Also, contacts can be included in the power connector to provide a communication link to the aircraft.

As shown in FIG. 7, the BMS 60 is connected to the positive battery cell terminal 72 by one or more conductors 13, 14. Another conductor 61 connects the BMS 60 to a first battery contact 85 on the battery power connector 120. A second battery contact 83 on the battery power connector 120 is connected to the negative battery cell terminal 74 by one or more conductors 67, 17. Accordingly, in the stored, uninstalled state shown in FIG. 7, no power is supplied to the BMS 60 from the battery cells 70 due to the open circuit between the BMS 60 and the negative battery cell terminal 74.

FIG. 8 shows the battery 100 installed in an aircraft. In its installed state, the battery's power connector 120 is engaged with an aircraft power connector 140 such that a positive aircraft power cable 53 is in electrical contact with the battery's positive terminal 122 and a negative aircraft power cable 55 is in electrical contact with the battery's negative terminal 124. Accordingly, in the installed state shown in FIG. 8, the battery 100 can provide electrical power from the battery cells 70 to an aircraft via the conductors 14, 15, 17 and 18, the engaged power connectors 120, 140, and the aircraft power cables 53, 55. In addition, in the installed state shown in FIG. 8, the aircraft can provide electrical power to the battery cells 70 for charging the battery cells 70 via the aircraft power cables 53, 55, the engaged connectors 120, 140, and the conductors 14, 15, 17 and 18.

As also shown in FIG. 8, the aircraft's power connector 140 includes a first aircraft contact 95, a second aircraft contact 93, and a jumper 89 that provides an electrically conductive path between the first aircraft contact 95 and the second aircraft contact 93. When the aircraft power connector 140 is engaged with the battery power connector 120 as shown in FIG. 8, the first battery contact 85 on the battery connector 120 contacts the first aircraft contact 95 on the aircraft power connector 140 and the second battery contact 83 on the battery connector 120 contacts the second aircraft contact 93 on the aircraft connector 140. Accordingly, the conductor 61, mated contacts 85, 95, the jumper 89, mated contacts 83, 93, and conductors 67 and 17 combine to form an electrically conductive path between the BMS 60 and the negative battery cell terminal 74. Consequently, in the installed state shown in FIG. 8, electrical power is constantly supplied from the lithium-ion cells 70 to the BMS 60. Accordingly, when the battery 100 is installed in an aircraft and connected as shown in FIG. 8, the BMS 60 is always powered on and is able to constantly monitor and control operation, charging and discharging of the lithium-ion cells 70, including balancing the capacities of the different cells 70, for example. Though not shown in FIG. 8, the battery 100 can also include a battery auxiliary receptacle for coupling the aircraft's maintenance and/or monitoring systems to the BMS 60 in order to exchange battery information between the BMS 60 and the aircraft, or this coupling can be included using additional contacts within the power connector.

The batteries 10, 100 described above are an improvement over batteries with battery management systems that are always on and constantly drain power from their associated battery cells even when in storage. When the described batteries 10, 100 are being stored or are otherwise disconnected and not in use, their battery management systems 60 are in a constant off state and consume no power from the lithium-ion battery cells 70, thus subsequently prolonging the batteries' shelf lives. Without the parasitic drain of the BMS, the rate of self-discharge of lithium-ion cells is about 3% per year, so a shelf life of 10 years or more can be achieved before the cells need to be recharged. This extended shelf life is especially beneficial for military aircraft applications, where a shelf life of 3 years or more is required. Conversely, when the batteries 10, 100 are installed and connected to an aircraft, their battery management systems 60 are constantly on and operational. Accordingly, the battery management systems 60 are always available to balance the charges between individual lithium-ion cells. Because the battery management systems 60 drain power from the lithium-ion cells at a low rate and because the batteries 10, 100 will typically be frequently recharged once installed, the fact that the battery management systems 60 remain powered on whenever the batteries 10, 100 are installed should not diminish the charges of the lithium-ion-cells below an unacceptable level. In summary, this invention provides a simple, practical, effective and highly reliable method to achieve substantially extended shelf life of aircraft batteries.

The above descriptions of various embodiments of the invention are provided to describe and illustrate various aspects and features of the invention without limiting the scope of the invention to the specifically described embodiments. Persons of ordinary skill in the art will appreciate that certain changes and modifications can be made to the described embodiments without departing from the scope of the invention. All such changes and modifications are intended to be within the scope of the appended claims.

What is claimed is:

1. A rechargeable battery system for supplying electrical power to an aircraft, the battery system comprising:
   a. a battery assembly of such size and configuration as to be installed in an aircraft and comprising:
      i. at least one lithium-ion cell having a positive cell terminal and a negative cell terminal;
      ii. a battery management system having a circuit connected to the cell and operable to monitor and control the operation of the lithium-ion cell, and having an off state and an on state, the battery management circuit being connected to one of the positive and negative cell terminals by a first conductor;
      iii. a battery connector having a first jumper terminal and a second jumper terminal;
      iv. a second conductor connecting the battery management circuit to the first jumper terminal;
      v. a third conductor connecting the second jumper terminal to the other of the positive and negative cell terminals; and
   b. an external connector configured to be engaged with the battery connector and including a jumper that electrically connects the first jumper terminal to the second jumper terminal when the battery connector is engaged with the external connector;
   c. wherein the battery management circuit is constantly in the off state when the external connector is not engaged with the battery connector, and the battery management circuit is constantly in the on state when the external connector is engaged with the battery connector.

2. The rechargeable battery system of claim 1 wherein the battery connector is a battery power connector and the external connector is an aircraft power connector, wherein the battery connector and external connector cooperate to provide power from the battery to the aircraft when the external connector is engaged with the battery connector.

3. The rechargeable battery system of claim 1 wherein the battery assembly further comprises a battery auxiliary receptacle.

4. The rechargeable battery system of claim 1 wherein the battery connector is a battery auxiliary receptacle and the external connector is an aircraft mating connector, wherein the battery connector and external connector cooperate to provide a communication link between the battery management system and the aircraft when the external connector is engaged with the battery connector.

5. The rechargeable battery system of claim 1 wherein the battery assembly comprises a plurality of lithium-ion cells and wherein the battery management circuit is operable to balance the capacities of the lithium-ion cells whenever the battery management circuit is in the on state.

6. A method of managing a rechargeable battery configured for connection to an external device and having one or more lithium-ion battery cells, the method comprising:
   a. providing a battery management circuit;
   b. preventing the supply of power from the battery cells to the battery management circuit when the rechargeable battery is disconnected from the external device; and
   c. supplying power from the battery cells to the battery management circuit when the rechargeable battery is connected to the external device;
   d. wherein the battery management circuit is always off when the rechargeable battery is disconnected from the external device and the battery management circuit is always on when the rechargeable battery is connected to the external device.

7. The method of claim 6 wherein the step of preventing the supply of power from the battery cells to the battery management circuit when the rechargeable battery is disconnected from the external device comprises providing an open circuit between the battery management circuit and the battery cells.

8. The method of claim 7 wherein the step supplying power from the battery cells to the battery management circuit when the rechargeable battery is connected to the external device comprises closing the open circuit.

9. The method of claim 8 wherein closing the open circuit comprises connecting an external connector to the battery that includes a jumper that closes the open circuit when the external connector is connected to the battery.

10. The method of claim 9 wherein the external connector is a power connector.

11. The method of claim 9 wherein the external connector is an auxiliary connector.

12. A battery management system for a rechargeable aircraft battery having at least one lithium-ion battery cell, the battery management system comprising:
   a. a battery connector adapted to connect the rechargeable battery to an external device, the battery connector having a first contact and a second contact;
   b. a battery management circuit having a first lead and a second lead, one of the leads being connected to a first terminal of the battery cell, and the other of the leads being connected to the first contact of the battery connector;
   c. a conductor connecting the second terminal of the battery cell to the second contact of the battery connector;
   d. an external connector comprising a jumper configured to selectively connect the first contact and the second contact when the external connector is removably connected to the battery connector; and
   e. wherein battery power is supplied from the battery cell to the battery management circuit when the jumper connects the first contact and the second contact, and no power is supplied from the battery cell to the battery control circuit when the jumper does not connect the first contact and the second contact.

13. The battery management system of claim 12 wherein the external connector is an electrical power connector configured to connect the battery cell to the external device.

14. The battery management system of claim 12 wherein the external connector is an instrumentation connector configured to at least partially connect the battery management circuit to the external device.

15. The battery management system of claim 12 wherein the battery comprises a plurality of battery cells and wherein the battery management circuit is configured to automatically balance the capacities of the battery cells whenever power is supplied from the battery cell to the battery management circuit.

16. A rechargeable battery system for supplying electrical power to an aircraft, the battery system comprising:
   a. a battery assembly of such size and configuration as to be installed in an aircraft and comprising:
      i. at least one lithium-ion cell having a positive cell terminal and a negative cell terminal;
      ii. a battery management system having a circuit connected to the cell and operable to monitor and control the operation of the lithium-ion cell, and having an off state and an on state;
      iii. the battery management circuit being normally open until the battery assembly is connected to one of the group consisting of the aircraft electrical system and an external power source, whereupon the battery management system is automatically activated.

17. A battery management system for a rechargeable aircraft battery having at least one lithium-ion battery cell, the battery management system comprising:
   a. a battery connector adapted to connect the rechargeable battery to an external device, the battery connector having a first contact and a second contact;
   b. a battery management circuit being connected to the battery cell;
   c. the battery management circuit being normally open until the battery assembly is connected to one of the group consisting of the aircraft electrical system and an external power source, whereupon the battery management system is automatically activated.

\* \* \* \* \*